Oct. 18, 1949.  B. A. MAIN, JR., ET AL  2,485,006
COUPLING
Filed May 9, 1947
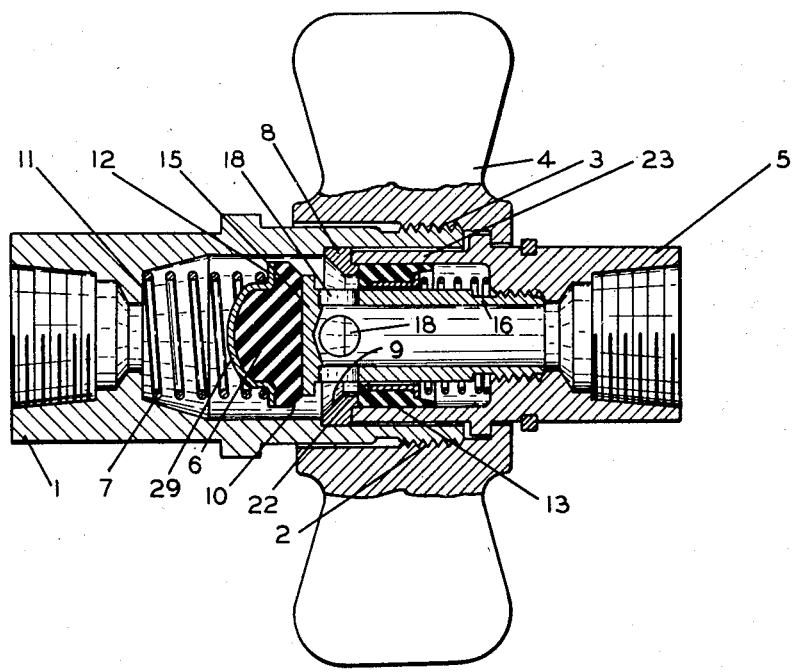
FIG. I.
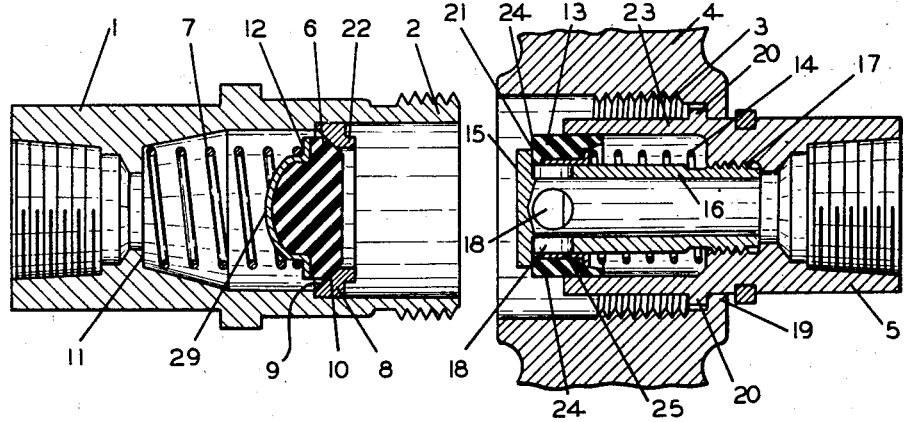
FIG. II.
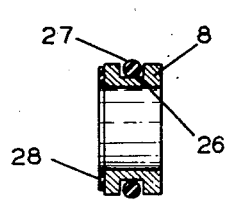
FIG. III.
Inventors
BENJAMIN A. MAIN JR.
and MARVIN W. BRANDAU
By Beaman & Patch
Attorneys Patented Oct. 18, 1949

2,485,006

UNITED STATES PATENT OFFICE 2,485,006

COUPLING

Benjamin A. Main, Jr., and Marvin W. Brandau, Jackson, Mich., assignors to Aeroquip Corporation, Jackson, Mich., a corporation of Michigan Application May 9, 1947, Serial No. 747,084

1 Claim. (Cl. 284—19)

This invention relates to couplings of the self-sealing type as disclosed in United States Patent No. 2,208,286, granted July 16, 1940, and among others, in United States Patent No. 2,311,239, granted February 16, 1943. Such couplings comprise a pair of hollow body parts adapted to be coupled together to form a common fluid conduit, the opposed ends of the body parts having abutting disc-like valve heads, one of which is axially movable with respect to a surrounding annular seat fixed in its body part, while the other is provided at one end of a tubular section fixed within the other body part and forming, with an outer surrounding wall of the latter, an annular chamber into which side ports in the said tubular section open and in which chamber a sleeve valve is mounted for reciprocable sliding motion upon said tubular section, said sleeve valve, when the coupling parts are separated, being resiliently biassed to a position in which it overlaps and seals said side ports and seats against the fixed disc-like valve head of its associated body part.

An object of the present invention is to provide an improved coupling of the type described, which can be manufactured more economically and which provides for the obtaining of an efficient seal.

Another object of the invention is to provide a self-sealing coupling of the type described which can be manufactured more economically and which can be employed not only to convey liquids but also gases and which will also seal when used under a vacuum.

Yet another object of the invention is to provide a self-sealing coupling of the type described which employs an improved form of valve sleeve capable of sealing when the coupling is employed to convey liquids or gases, or under vacuum.

The construction, arrangement and combination of parts for accomplishing these and other objects will appear from a consideration of the following description with reference to the drawings and the appended claim.

In the accompanying drawings,

Fig. I is a longitudinal section of one form of coupling embodying a sealing sleeve in accordance with the invention, the coupling parts being shown in the coupled condition.

Fig. II is a similar view of Fig. I but showing the coupling parts uncoupled, and Fig. III is a detail view showing a modified and probably preferred form of sealing sleeve.

Referring to the drawings, a coupling is shown comprising one hollow tubular body part 1 having one extremity thereof provided with an exterior screw-threaded portion 2 with which the interior screw-threaded portion 3 of a coupling nut 4 is engageable to effect a coupling of this body part 1 to a second tubular body part 5 so that when coupled together as shown in Fig. I the two body parts are secured in axial alignment. This is according to the arrangement illustrated, but it will be understood that other relative angular dispositions of the two body parts, in the coupled condition thereof, is possible.

The coupling is of the self-sealing type as above mentioned, whereby when the body parts are uncoupled their terminal ends are automatically sealed by automatically operating valves. These are constituted in the one body part 1, by a floating valve head 6 of disc-like form which, in the uncoupled condition of the body parts as shown in Fig. II, is urged by a coil spring into contact with an annular valve seat 8 on the inside of the body part 1, this annular valve seat 8 having an annular bevelled surface 9 with which a correspondingly annular bevelled surface 10 on the valve head 6 engages in a fluid-tight manner when the body part 1 is disconnected from the coupling nut 4 and body part 5. The coil spring 7 engages at one end with an internal radial shoulder 11 in the body part 1 and at the opposite end engages with an annular radial ledge 12 provided on the back of the valve head 6.

The self-sealing valve for the coupling body part 5 is constituted by a plunger sleeve 13 which is spring-biased, by a coil spring 14, so that this valve sleeve, in the uncoupled condition, is urged into fluid-tight sealing engagement with a valve seat 15 provided upon one end of a tubular section 16 about which the concentric valve sleeve is slidably mounted and which tubular section 16 is itself concentric with the body part 5 and is secured thereto at its opposite end by the screw-threading 17.

The sleeve 13 is made of rubber, rubber composition or like material, such as reinforced rubber, or a synthetic composition or compound, as indicated in the drawings, which material is capable of being bonded to the metal carrier sleeve therefor, the latter being piloted upon the tubular section 16 as shown.

The construction and arrangement is such that when the coupling parts are disconnected (i. e. uncoupled) as shown in Fig. II, the two self-sealing valves close the ends of their respective body parts and in this position of the valve sleeve 13 the latter is positioned over ports 18 in the tubular section 16 so as to close and seal these ports. When, however, the coupling nut (retained upon the body part 5 by the inwardly directed radial end flange 19 engaging behind the outwardly directed radial flange 20 on the body part 5) is screwed upon the screwed end 2 of the other body part 1 to couple the parts together, the outer peripheral annular end edge portion 21 of the valve sleeve 13 is engaged by the axial ring extension 22 of the annular valve seat 8 and the relative axial movement, produced as the coupling parts are drawn together in the coupling operation, causes the valve sleeve 13 to be forced backwards against the action of the spring 14 at the same time as the valve head 6 is forced backwards in the opposite direction due to the contact between this valve head and the valve seat 15. In the coupled condition, therefore, as shown in Fig. I, the ports 18 are uncovered and the valve head 6 is displaced from its valve seat 8, thereby providing a free passageway for the flow of fluids through the entire coupling.

The valve sleeve is mounted between the tubular section 16 and an outer concentric tubular extension 23 of the body part 5 and the valve sleeve is so formed as always to maintain a fluid-tight seal with the interior surface of this extension 23. In addition, when the parts are uncoupled, the valve sleeve at the end thereof adjacent the valve seat 15, maintains a fluid-tight seal with the latter, as shown in Fig. II, while, when the parts are coupled together as shown in Fig. I, this end of the valve sleeve maintains a fluid-tight seal with the said ring extension of the valve seat 8. The valve sleeve, therefore, has three distinct and important sealing functions, the existence of which permits the coupling to be employed to convey gases as well as liquids and also enables the coupling to be employed under negative pressure or vacuum without loss thereof. For this purpose, besides being constructed as shown, the valve sleeve is also formed, at least in the region where such sealing functions are required to exist, of a suitable sealing material such as reinforced rubber or a synthetic sealing composition or compound.

In Figs. I and II this sealing material is shown in the form of a sleeve 24 secured, as by bonding, to an inner metal sleeve 25.

In the alternative sleeve construction, as shown in Fig. III, however, the sleeve 8 is formed from metal to have an annular groove 26 in its outer surface in which an O ring 27 is located to maintain the required sealing contact with the interior surface of the tubular extension 23, while a ring 28 of sealing material is secured as by bonding, to the end surface of the metal sleeve 8 where the dual sealing functions are required, i. e. at the valve seat 15, when uncoupled, and on the ring extension 22 of the other valve seat 8, when coupled.

In Figs. I and II there is also shown a novel and advantageous construction of the valve head 6, which is itself constituted by a resilient material, such as reinforced rubber or synthetic compound bonded to a metal cup-like stamping 29. It is also possible that this valve head and also the valve sleeve may be made entirely from resilient material without any metal inserts.

Various changes and modifications may be made as to details of construction without departing from the scope of the claim.

What we claim is:

In a fluid coupling of the type having a pair of body parts with opposed ends having abutting valve heads, one of which is axially movable with respect to a surrounding seat fixed in its body part, while the other is provided at one end of a tubular section within its respective body part and defining the interior wall of an annular chamber, a fluid flow control member slidably mounted upon said tubular section and reciprocable in said annular chamber, said member comprising an inner metal sleeve slidable upon said section and an outer rubber sleeve encircling said metal sleeve and having a portion overhanging one end of the latter and sealing against said tubular section, said rubber sleeve also sealing against the exterior wall of said annular chamber as well as against the valve seat on said tubular stem.

BENJAMIN A. MAIN, JR.
MARVIN W. BRANDAU.

REFERENCES CITED

The following references are of record in the file of this patent:

UNITED STATES PATENTS

| Number | Name | Date |
|---|---|---|
| 1,335,521 | Murphy | Mar. 30, 1920 |
| 1,364,147 | Spahr | Jan. 4, 1921 |
| 1,805,580 | Hazlett et al. | May 19, 1931 |
| 2,208,286 | Berger | July 16, 1940 |
| 2,254,997 | Fisher | Sept. 2, 1941 |
| 2,304,390 | Wolfram | Dec. 8, 1942 |
| 2,311,239 | Main et al. | Feb. 16, 1943 |
| 2,319,015 | Speth | May 11, 1943 |
| 2,391,022 | Main | Dec. 18, 1945 |
| 2,398,170 | Williams-Foxcroft | Apr. 9, 1946 |
| 2,416,967 | Thomas | Mar. 4, 1947 |